United States Patent [19]

Yoshizawa et al.

[11] Patent Number: 4,678,841
[45] Date of Patent: Jul. 7, 1987

[54] METHOD OF PRODUCING A CYCLIZED POLYDIENE

[75] Inventors: Tamae Yoshizawa; Kiyoto Otsuka; Shiro Nagata, all of Kurashiki; Hideo Takamatsu, Hasaki, all of Japan

[73] Assignee: Kuraray Company, Ltd., Kurashiki, Japan

[21] Appl. No.: 707,843

[22] Filed: Mar. 4, 1985

[30] Foreign Application Priority Data

Mar. 5, 1984 [JP] Japan .................................. 59-42434
Jul. 13, 1984 [JP] Japan .................................. 59-146554
Jan. 14, 1985 [JP] Japan .................................. 60-4461

[51] Int. Cl.$^4$ .............................................. C08F 8/48
[52] U.S. Cl. ................................ 525/353; 525/333.1; 525/333.2; 525/371
[58] Field of Search ................. 525/344, 359.4, 371, 525/353

[56] References Cited

U.S. PATENT DOCUMENTS 4,085,058  4/1978  Adachi et al. ...................... 524/533
4,248,986  2/1981  Lal et al. .............................. 525/184

OTHER PUBLICATIONS

*Kirk–Othmer Encyclopedia of Chemical Terminology*, vol. 10, 2d Ed., (1966), pp. 158–161.

Primary Examiner—Paul R. Michl
Assistant Examiner—Bernard Lipman
Attorney, Agent, or Firm—Oblon, Fisher, Spivak, McClelland & Maier

[57] ABSTRACT

A method of producing a cyclized polydiene comprising cyclizing a polydiene in an organic solvent with the aid of a binary catalyst comprising tin halide or titanium halide and an organosulfonic acid or a haloacetic acid. The method provides a cyclized polydiene having a narrow molecular weight distribution in a short reaction time and with high reproducibility. The method does not entail side reactions causing gelation or discoloration.

16 Claims, 2 Drawing Figures

METHOD OF PRODUCING A CYCLIZED POLYDIENE

BACKGROUND OF THE INVENTION

1. Field of the Invention

This invention relates to a method of producing a high quality cyclized polydiene. More particularly, the invention relates to a method of producing a cyclized polydiene suitable for use as a resinous component of a photoresist for the production of semiconductors.

2. Discussion of the Background

It has long been known that the cyclization of a polydiene such as natural rubber, synthetic polyisoprene, polybutadiene, etc. in an organic solvent gives rise to a cyclized form of the starting material polymer. Such cyclized polydienes have heretofore been used as insulating materials, adhesives, coatings, rubber compounding agents, photosensitive resins, etc. With the recent advance in integrated circuit (IC) technology, the importance of photosensitive resins for use as photoresists in the manufacture of semiconductors has been increasing. For this application, it is necessary that the cyclized polydiene have a narrow molecular weight distribution and a comparatively high degree of cyclization. Generally, when the cyclized polymer has a narrow molecular weight distribution, it gives a photoresist having a high resolution. Moreover, its degree of cyclization is preferably within the range of 40 to 75 percent, and this, together with the average molecular weight of the cyclized polymer, has a significant influence on the sensitivity of photoresist and the resist thickness remaining after development in the process of producing semiconductors.

The hitherto-known cyclization catalysts include Bronsted acids such as sulfuric acid, sulfonic acid, haloacetic acids, perchloric acid and Lewis acids such as tin tetrachloride, titanium tetrachloride, aluminum halides, boron trifluoride, organo-aluminum compounds, etc. (For example, see Rubber Age 55, 361–365 (1944) or Japanese Patent Kokai No. Sho 47-34834.)

However, since these catalysts generally are low in activity and afford only low reaction rates, they must be used in a large quantity or long reaction times are required to obtain a cyclized polydiene with a comparatively high degree of cyclization. Moreover, the resulting cyclized polydiene generally has a wide molecular weight distribution. These reactions are also low in reproducibility. Particularly when a Bronsted acid is employed, side reactions causing gelation or discoloration tend to take place. If large amounts of gels are produced, it requires a great deal of effort to separate them.

Thus, the conventional cyclization reaction cannot provide a cyclized polydiene having a narrow molecular weight distribution and a comparatively high degree of cyclization with good reproducibility and without side reactions causing gelation or discoloration.

SUMMARY OF THE INVENTION

This invention relates to a high quality method of producing a cyclized polydiene. It is an object of this invention to provide a method of producing a cyclized polydiene having a high degree of cyclization, without side reactions causing gelation or discoloration and in a short reaction times. The absence of side reactions causing gelation means that when the reaction mixture is filtered through a membrane filter with a pore size of 1 μm, substantially no gels remain on the membrane filter.

It is another object of this invention to provide a method of producing a cyclized polydiene with high reproducibility in regard to the degree of cyclization.

It is still another object of this invention to provide a method of producing a cyclized polydiene having a narrow molecular weight distribution.

It is another yet object of this invention to provide a method of producing a cyclized polydiene suitable for use, for example, as a resinous component of a photoresist for IC production. Though it depends on microstructural characteristics such as cyclicity ratio, average cyclicity and amounts of uncyclized diene units and cyclized segments such as =CH$_2$, =CH— or

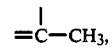

a cyclied polydiene suitable for a resinous component of a photoresist is generally a compound which has a cyclization degree of 40 to 75% and a small ratio ($\overline{M}_W/\overline{M}_N$) of weight average molecular weight (hereinafter referred to briefly as $\overline{M}_N$) to number average molecular weight (hereinafter referred to briefly as $\overline{M}_N$) and is substantially free of impurities. The impurities mentioned above are, for example, the above-mentioned gels, compounds containing phosphorus or boron which should not be present in photoresists because of these elements are used as silicon dopants in semiconductors.

In accordance with this invention, the above-mentioned objects are accomplished by a method of producing a cyclized polydiene comprising cyclizing a polydiene in an organic solvent with the aid of a binary catalyst comprising a Lewis acid selected from the class consisting of tin halides and titanium halides and a Bronsted acid selected from the class consisting of sulfonic acids of the general formula (1) R—SO$_3$H (wherein R is an alkyl group or an aryl group) and haloacetic acids of the general formula (2) H$_n$X$_{3-n}$CCOOH (wherein X is a halogen atom and n is an integer of 0 to 2).

DETAILED DESCRIPTION OF THE INVENTION

Figure 1:
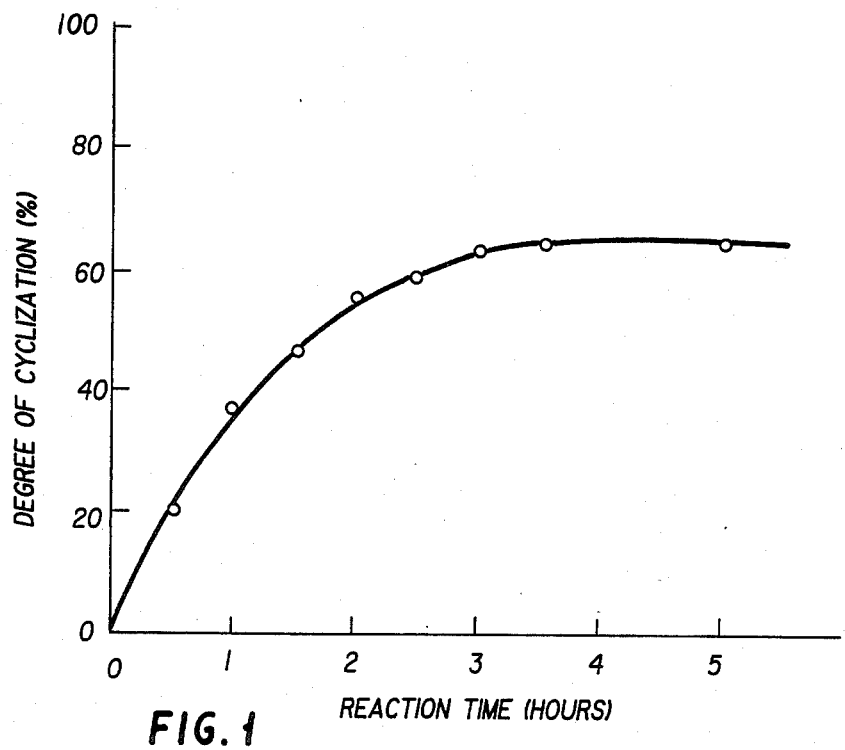
FIGS. 1 and 2 show the relationships of reaction time with the degree of cyclization (%) of the cyclization product polymers in the cyclization reactions of Examples 1 and 7, respectively.

The polydienes that may be employed in accordance with this invention include homopolymers of conjugated dienes such as isoprene, butadiene, pentadiene etc., copolymers of such conjugated dienes, copolymers of such conjugated dienes with unsaturated compounds such as styrene, α-methylstyrene, ethylene, propylene, isobutylene, acrylonitrile, etc., and modified homopolymers or copolymers obtainable by introducing functional groups such as carboxyl groups and groups having an imide structure into the corresponding unmodified homopolymers or copolymers referred to above. Specifically, natural or synthetic polyisoprenes such as natural rubber, balata, guttapercha, synthetic cis-1,4-polyisoprene, synthetic trans-1,4-polyisoprene, etc., polybutadiene, styrene-diene copolymers and acrylonitrile-diene copolymers may be mentioned as examples. Particularly with synthetic polyisoprenes, the cyclization product suitable for use as a resinous component of a photoresist can be obtained without side reactions causing gelation or discoloration in a short time as compared with the reaction using the conventional cyclization catalyst.

For the purposes of this invention, the weight average molecular weight of the starting polydiene is preferably in the range of 10,000 to 1,000,000. For the production of a cyclized polydiene suitable for use as a resinous component of a photoresist of a semiconductor, the starting polydiene preferably has a weight average molecular weight in the range of 30,000 to 500,000 and, for still better results, in the range of 50,000 to 300,000 in consideration of the sensitivity of the photoresist and the resist thickness remaining after development and the workability in the preparation of the photoresist. The molecular weight distribution of the starting polydiene should be as narrow as possible. If the molecular weight distribution of the starting polydiene is broad, the molecular weight distribution of the cyclized polydiene will be still broader so that the latter cannot be used for the production of a photoresist having a high resolution. Since the cyclization reaction is generally accompanied by a scission of the polymer chain or an intermolecular cross-linking, even under the most favorable conditions, the molecular weight distribution of the cyclized polydiene is ever narrower than that of the starting material polydiene. Moreover, if the molecular weight of the starting material polydiene is too high, an additional procedure such as mastication for adjusting the solution to a viscosity suitable for cyclization reaction is required, with the result that the molecular weight distribution is broadened.

The Lewis acid which is used as a component of the binary catalyst for the cyclization reaction according to this invention must be a tin halide or a titanium halide. If other Lewis acids such as boron halides, iron halides, aluminum halides or organoaluminum compounds are employed, there will not be realized an increase in catalyst activity even if these are used with a Brønsted acid. Moreover, the rate of cyclization reaction will be so low that the cyclized polydiene with a high degree of cyclization cannot be obtained in a short period of time. As examples of said tin halides and titanium halides, there may be mentioned tin tetrafluoride, tin tetrachloride, tin tetrabromide, tin tetraiodide, tin difluoride, tin dichloride, tin dibromide, tin diiodide, titanium tetrafluoride, titanium tetrachloride, titanium tetrabromide, titanium tetraiodide, titanium trifluoride, titanium trichloride, titanium tribromide, titanium triiodide, titanium difluoride, titanium dichloride, titanium dibromide, titanium diiodide, etc. Among these compounds, tetrahalides such as tin tetrachloride, tin tetrabromide, titanium tetrachloride, titanium tetrabromide, etc. are preferred, and particularly, tin tetrachloride is desirable. These Lewis acids may be used alone or in mixture with one or more of the others.

The Brønsted acid which is used as another component of the binary catalyst for the cyclization reaction according to this invention should be an organic sulfonic acid of the general formula (1) R—SO$_3$H or a haloacetic acid of general formula (2) H$_n$X$_{3-n}$—C-COOH. Even if a Brønsted acid other than the above, e.g. sulfuric acid, benzonic acid or salicylic acid, is employed together with said Lewis acid, the binary catalyst will not have a sufficiently high activity and the rate of cyclization reaction will not be high, so that the desired cyclized polydiene with a high degree of cyclization cannot be obtained in a reasonably short time. Referring to the above general formula (1), R is an alkyl group or an aryl group. The group R preferably contains 1 to 10 carbon atoms. Preferred examples of said alkyl group are lower alkyls such as methyl, ethyl, propyl and butyl, while said aryl group is preferably phenyl, tolyl, naphthyl or the like. Referring to the general formula (2), X is a halogen atom such as fluorine, chlorine, bromine or iodine, and n is an integer of 0 to 2. Representative examples of such organic sulfonic acid include alkanesulfonic acids having straight-chain alkyl groups such as methanesulfonic acid, ethanesulfonic acid, 1-propanesulfonic acid, 1-butanesulfonic acid, 1-pentanesulfonic acid, 1-hexanesulfonic acid, 2-butanesulfonic acid, 2-pentanesulfonic acid, 3-hexanesulfonic acid, etc., alkanesulfonic acids having branched alkyl groups such as 2-methyl-1-propanesulfonic acid, 1,1-dimethylethanesulfonic acid, 2-methyl- 1-butanesulfonic acid, 3-methyl-1-butanesulfonic acid, 1,1-dimethyl-1-propanesulfonic acid, 2,2-dimethyl-1-propanesulfonic acid, 1,2-dimethyl-1-propanesulfonic acid, 2-methyl-1-pentanesulfonic acid, 3-methyl-1-pentanesulfonic acid, 4-methyl-1-pentanesulfonic acid, 1,1-dimethyl-1-butanesulfonic acid, 2,2-dimethyl-1-butanesulfonic acid, 3,3-dimethyl-1-butanesulfonic acid, 1,2-dimethyl-1-butanesulfonic acid, 1,3-dimethyl-1-butanesulfonic acid, 2,3-dimethyl- 1-butanesulfonic acid, 2-ethyl-1-butanesulfonic acid, etc., and aromatic sulfonic acids such as benzenesulfonic acid, toluenesulfonic acid, naphthalenesulfonic acid, etc. Representative examples of said haloacetic acid include chloroacetic acids such as monochloroacetic acid, dichloroacetic acid, trichloroacetic acid, etc. and fluoroacetic acids such as monofluoroacetic acid, difluoroacetic acid, trifluoroacetic acid, etc. Among those Brønsted acids, organic sulfonic acids and particularly methanesulfonic acid, ethanesulfonic acid, propanesulfonic acid, butanesulfonic acid, benzenesulfonic acid and toluenesulfonic acid are preferred. Particularly, the alkanesulfonic acids mentioned above are preferred to said aromatic sulfonic acids since they show markedly higher catalytic activity with the aid of the Lewis acid. These Brønsted acids may be used alone or together with one or more of the other.

Generally, in cyclization reactions using a binary catalyst, there is the trouble of side reactions causing gelation or discoloration, the broadening of the molecular weight distribution during the cyclization reaction and/or a low rate of cyclization reaction. For Example, when polyisoprene is cyclized by means of tin tetrachloride and sulfuric acid, marked gelation takes place during the cyclization reaction so that it takes a great deal of effort to remove the gels. When polyisoprene is cyclized in a solvent using an aluminum halide and an organic halide in combination, the viscosity of the cyclization reaction mixture increases and even if the reaction is conducted for a long time, the degree of cyclization does not exceed several percent at best and gels are formed. It is surprising that none of the above-mentioned troubles takes place when the above-mentioned specific Lewis acid and Brønsted acid are used together according to this invention.

The molar ratio of said Lewis acid to said Brønsted acid in the binary catalyst used in the cyclization reaction according to this invention cannot be stated in general terms, for it depends on the particular species of components of the binary catalyst, types of the starting polydienes, concentration of the starting polydiene in the cyclization reaction system, the temperature and time of the cyclization reaction and the desired degree of cyclization of the final cyclized polydiene. It is preferred that when said Brønsted acid is an aromatic sulfonic acid or a haloacetic acid, the molar ratio is in the range of 150:1 through 1:10 and, for still better results, in range of 50:1 to 1:2. When the Brønsted acid is an alkanesulfonic acid, the molar ratio should be in the range of 200:1 to 1:200, even desirably in the range of 150:1 to 1:20, and for still more better results, in the range of 150:1 to 1:10.

If the molar ratio of said Lewis acid to said Brønsted acid is too high, the rate of cyclization reaction will also be so low that the cyclization product having a sufficient degree of cyclization cannot be obtained in a short time. And if the reaction is conducted for a long time, the molecular weight distribution of the cyclized polydiene will become too broad. On the other hand, if the molar ratio is too low, side reactions causing gelation or discoloration tend to occur so that a cyclized polymer of high quality cannot be obtained.

The total amount of said Lewis acid and Brønsted acid to be used for the cyclization reaction cannot be stated in general terms, for it depends on the particular species of acids used in the binary catalyst, the molar ratio of said Lewis acid to said Brønsted acid, reaction temperature, and the desired degree of cyclization of the resulting cyclized polymer. However, when an aromatic sulfonic acid or a haloacetic acid is used as said Bronsted acid, the total number of the moles per 100 moles of conjugated diene monomer units of the starting polydiene (hereinafter referred to briefly as the amount of the catalyst) is in the range of 0.005 to 5, preferably, 0.01 to 3. When an alkanesulfonic acid is used as said Brønsted acid, the amount of the catalyst is in the range of 0.001 to 5, preferably 0.005 to 3. If the amount of the catalyst is too large, the cyclization reaction proceeds so rapidly that it cannot be easily controlled to obtain the cyclized polymer having a desired degree of cyclization with adequate reproducibility. Moreover, the cyclized polymer will contain a large amount of catalyst residues so that it cannot be used as a photoresist or the like that must have a high degree of purity. If conversely the amount of the catalyst is too small, the cyclization reaction proceeds too slowly to be of practical utility.

The organic solvent used for the cyclization reaction of this invention may be any solvent that will dissolve the starting material polydiene and the resulting cyclized polymer and be inert to said starting material polymer, resulting cyclized polymer and catalyst. Preferred examples of such solvent include aliphatic hydrocarbons or its derivatives such as hexane, heptane, octane, dichloromethane, etc., alicyclic hydrocarbons or its derivatives such as cyclohexane, and aromatic hydrocarbones or its derivatives such as benzene, cholorobenzene, toluene, xylene, etc. Depending on the combination of a sulfonic acid with an organic solvent there are cases in which the solubility of the aliphatic sulfonic acid is not high. In the cyclization reaction using the binary catalyst in accordance with this invention, high catalytic activity is realized irrespective of whether the reaction system is homogeneous or not. For a better control of the reaction systems, a homogeneous dissolution of the catalyst may be ensured, for example by adding a ketone or other good solvent for the sulfonic acid in a small proportion.

By-products such as gels are substantially not formed during the cyclization reaction according to the method of this invention, but depending on the combination of the starting material polydiene, solvent and catalyst, there may be cases in which the addition of an antioxidizer such as a phenolic or amino-compound to the reaction system contributes to a substantially complete inhibition of gelation to give a still better results.

When the concentration of the starting material polydiene in the solution is too high, the cyclization reaction solution is too viscous to permit easy control of the reaction. On the other hand, if the concentration is too low, a larger amount of the solvent will be required so that the production cost will be increased and the production efficiency will be decreased. Generally, the preferred concentration is not higher than 40 percent by weight and, for still better results, in the range of 5 to 20 percent by weight.

The cyclization reaction is generally conducted at a temperature ranging from 0° to 200° C. but in order that the cyclized polydiene may be efficiently produced without gelation and discoloration, the reaction is preferably conducted at a temperature ranging from 30° to 100° C. In conducting the cyclization reaction, it is preferable to avoid the influence of water as much as possible.

Since the catalyst used in the cyclization reaction of this invention is high in selectivity and activity and, therefore, the reaction can be conducted under mild conditions, side reactions causing gelation and discoloration do not occur virtually. Moreover, in the cyclization reaction according to the method of this invention, the reaction is reproducible in regard to the degree of cyclization of the resulting cyclized polymer. Therefore, by varying the molar ratio of catalyst components, amount of the catalyst, and reaction temperature and time, a cyclized polydiene having a desired degree of cyclization can be easily obtained.

In the usual cyclization reaction, generally the cyclization of the polydiene is accompanied by a scission of the polymer chain or a cross-linking of polymer molecules so that the molecular weight distribution is broadened as compared with the starting polymer. In accordance with the method of this invention, there is no remarkable change in molecular weight distribution. In accordance with this invention, the ratio of ($\overline{M}_W/\overline{M}_N$) of the cyclization polydiene to ($\overline{M}_W/\overline{M}_N$) of the starting polydiene is not greater than 3 and, under favorable conditions, not greater than 1.5. Therefore, a cyclized polydiene with a narrow molecular weight distribution can be obtained if there is used a starting polydiene having a narrow molecular weight distribution.

Moreover, since the catalyst used in the method of this invention has a high activity, its amount may be small and this is not only an economic advantage but means that the catalyst can be easily removed with a relatively few times of washing with water after the reaction so that the catalyst residues in the cyclized polydiene can be held to a minimum and, hence, a cyclized polydiene of a high purity can be obtained. As a result, the cyclized polydiene according to this invention is very useful as a resinous component of a photoresist which should be as free of metallic and other impurities as possible.

The polydiene to be cyclized by the method of this invention can be produced by any of the known methods. However, for the production of a synthetic polydiene with a narrow molecular weight distribution and the proper average molecular weight which gives a soltuion viscosity suited to the cyclization reaction, a solution polymerization process using an anionic polymerization catalyst is preferred. Particularly the solution polymerization process using an organolithium compound as the polymerization catalyst is most suitable for the production of the starting polydiene of the invention for the following reasons. One of the reasons is that a polymer with a narrow molecular weight distribution can be easily obtanied and that as the average molecular weight of the product polymer primarily depends on the number of moles of conjugated diene with respect to lithium in the organolithium catalyst, a polymer of a desired average molecular weight can be easily obtained. For example, when a conjugated diene, particularly isoprene, is polymerized with the aid of an organolithium compound in a nonpolar organic solvent, there is generally easily obtained a polymer having a narrow molecular weight distribution, in terms of ($\overline{M}_W/\overline{M}_N$) of not greater than 2.0 and, under favorable conditions, of not greater than 1.5, and having a desired average molecular weight. Another reason is that the organolithium compound can be easily removed by washing with water after the polymerization reaction and if it remains to be present in the cyclization reaction system, its adverse influence may be prevented by inactivating the active terminal of the product polymer that is orginating therefrom by a simple procedure as will be described hereinafter. From the above points of view, the solution polymerization of a conjugated diene monomer with the aid of an organolithium compound will be explained below.

The organolithium compound to be used in this polymerization process is preferably a monolithium compound of general formula R'Li. In the general formula, R' is a hydrocarbon residue which has preferably 1 to 12 carbon atoms. The hydrocarbon residue is preferably an alkyl group of 1 to 12 carbon atoms or an aryl group of 6 to 12 carbon atoms. Thus, for example, alkyl-lithiums such as methyllithium, ethyllithium, propyllithium, isopropyllithium, butyllithium, pentyllithium, isoamyllithium, etc. and aryl-lithiums such as phenyllithium, tolyllithium, naphthyllithium, etc. may be mentioned. The or9anic solvent used in this reaction is an organic compound which dissolves the starting conjugated diene and product polymer and is inert to the organolithium compound. Preferred examples of such organic solvent incluce aliphatic hydrocarbons such as pentane, hexane, heptane, etc., alicyclic hydrocrabons such as cyclohexane, etc., and aromatic hydrocarbons such as benzene, toluene, xylene, etc.

To carry out the polymerization reaction, generally the conjugated diene or a monomer mixture containing the conjugated diene as a main component is first dissolved in said organic solvent and, then, the organolithium compound is added. Alternatively, the organolithium compound is first added to the organic solvent and, then, the conjugated diene or the monomer mixture containing the conjugated diene as a main component is added.

The concentration of the conjugated diene in the polymerization system is in the range of 10 to 90 percent by weight, preferably, 20 to 80 percent by weight. Within this range, the polymerization reaction can be easily controlled and the reaction proceeds with efficiency. The polymerization temperature is generally in the range of 0° to 150° C. and preferably in the range of 20° to 100° C. The polymerization time need be such that the conversion of polymerization will be 100 percent. Thus, generally it may range from 0.1 to 100 hours and preferably from 0.5 to 20 hours.

By the above polymerization reaction, there is obtained a solution of a polydiene having a desired average molecular weight and a narrow molecular weight distribution. The polydiene purified and isolated from the above solution can be subjected to the cyclization reaction according to this invention. When the solvent for the cyclization reaction is the same as the solvent used in the above polymerization reaction, the reaction mixture obtained by the above polymerization reaction can be directly subjected to cyclization reaction, whereby the step of separating and purifying the product polymer from the polymerization reaction mixture and the step of dissolving the polymer in the solvent for the cyclization reaction solvent can be omitted so as to simplify the process and effect savings in production cost. In this connection, before subjection of the solution of product polymer ( the so-called living polymer) from the solution polymerization process to the cyclization reaction, it is necessary to inactivate the active terminal of the polymer. If the living polymer having an active terminal is directly subjected to the cyclization reaction, there will occur such troubles as low rate of cyclization reaction, broadened molecular weight distribution and abundant gelation. It has been found that when the inactivation of such active terminal of the product polymer is effected by the addition of a phenolic compound, the subsequent cyclization reaction may proceed smoothly. The cyclization does not proceed smoothly when an alcohol is used in place of the phenolic compound.

The phenolic compound referred to above is a compound containing at least one phenolic hydroxyl group in its molecule. Examples of such phenolic compounds include 2,6-di-t-butyl-4-methylphenol 2-butyl-4-hydroxyanisole, 3-butyl-4-hydroxyanisole, 6-(4-hydroxy-3,5-di-t-butylanilino)-2,4-bisoctylthio-1,3,5-triazine, 4,4'-dihydroxydiphenyl, 2,2'-methylenebis(4-methyl-6-t-butylphenol), 1,1'-bis(4-hydroxyphenyl)-cyclohexane, 4,4'-thiobis(6-t-butyl-3-methylphenol), 2,5-di-t-butylhydroquinone, 1,3,5-trimethyl-2,4,6-tris(3,5-di-t-butyl-4-hydroxybenzyl)benzene, and polyphenols having 4 or more phenolic hydroxyl groups. Among these compounds, phenolic compounds having an alkyl group, especially a butyl group, in α-position, particularly 2,6-di-t-butyl-4-methylphenol, 6-(4-hydroxy-3,5-di-t-butylanilino)-2,4-bisoctylthio-1,3,5-triazine, 2,2'-methylenebis(4-methyl-6-t-butylphenol), etc., are preferred.

While these phenolic compounds may each be used alone, two or more species may be used in combination.

In regard to the amount of such phenolic compound, the molar equivalent ratio of its hydroxyl group to lithium in the organolithium compound used in the polymerization reaction is generally in the range of 0.8 to 20 and preferably in the range of 1 to 15. If this molar ratio is too small, it is difficult to prevent broadening molecular weight distribution in the cyclization reaction so that a cyclized polydiene having a sufficiently narrow molecular weight distribution may not be obtained. On the other hand, if said ratio is too large, the rate of the cyclization reaction, and so the degree of cyclization of the cyclized polymer are remarkably reduced.

The phenolic compound may be used as dissolved in the same solvent as that of the polymerization reaction at the time when it is added to the polydiene solution at the end of the polymerization reaction. After this termination of polymerization reaction with the phenolic compound, the product solution is subjected to the cyclization reaction with the aid of the binary catalyst described hereinbefore.

This invention will be described below in further detail by way of examples, it being to be understood, however, that these exampls are not intended to limit the scope of the invention. In the examples and control examples hereinafter given, the weight average molecular weight ($\overline{M}_W$) and molecular weight distribution ($\overline{M}_W/\overline{M}_N$) were determined by gel permeation chromatography and the degree of cyclization and micro-structural charaqteristics were determined by nuclear magnetic resonance spectrometry.

EXAMPLE 1 cis-1,4-Polyisoprene having a weight average molecular weight of ($\overline{M}_W$)=116,200, a molecular weight distribution of ($\overline{M}_W/\overline{M}_N$)=1.46, and a cis-1,4 percentage of 71% as prepared by polymerizing isoprene using n-butyllithium as a catalyst was dissolved in xylene to give a 5% (by weight) solution. Under dry nitrogen at 40° C., tin tetrachloride and p-toluenesulfonic acid in a molar ratio of 2.3:1 (molar ratio of Lewis acid to Brønsted acid will hereinafter referred to briefly as molar ratio) was added to the above solution in a proportion (hereinafter referred to as amount of catalyst, which is the total number of moles of said catalyst components per 100 moles of isoprene monomer units of said polyisoprene) of 0.5 and the mixture was reacted at 40° C. with stirring. The above reaction was repeated a few times. During each of the reactions, the reaction mixture was not colored or, if it was, would become colorless and clear upon washing with water and showed no evidence of gels on a 1 μm membrane filter. The microstructural characteristics such as cyclicity ratio, average cyclicity, percentage of each microstructure and molecular weight distribution of the final product are as set forth in Table 1.

TABLE 1

| | |
|---|---|
| Cyclicity ratio | 0.28 |
| Average cyclicity | 3.1 |
| Percentage of unreacted isoprene units | 17.4 |
| Percentage of =CH$_2$ in cyclized segment | 14.3 |
| Percentage of =CH— in cyclized segment | 50.5 |
| Percentage of =C—CH$_3$ in cyclized segment | 17.8 |
| Degree of cyclization | 63.4% |
| Molecular weight distribution ($\overline{M}_W/\overline{M}_N$) | 1.90 |

As will be seen from FIG. 1, the degree of cyclization of the product cyclized polyisoprene increased linearly with time immediately following the initiation of reaction, then traces a less steep curve and finally approaches a saturation level. While the above reaction was repeated a few times, the relationship of reaction time and degree of cyclization invariably approximated the curve of FIG. 1, indicating a good reproducibility. It was therefore found that the rate of increase in degree of cyclization is largely dependent on the initial rate of reaction, serving as an indicator of catalyst activity.

EXAMPLE 2 AND CONTROL EXAMPLE 1

In the above example, the molar ratio of tin tetrachloride to p-toluenesulfonic acid was varied as shown in Table 2 and the initial rate of reaction was investigated in terms of the rate of increase in degree of cyclization per unit time (minutes) and unit amount of the catalyst. Moreover, the reaction mixture which had substantially approached a saturated degree of cyclization was filtered through a 1 μm membrane filter to investigate the presence or absence of gels. In addition, the change in molecular weight distribution during the cyclization reaction was investigated in terms of the ratio C/R of the molecular weight distribution ($\overline{M}_W/\overline{M}_N$)$_C$ of the cyclization product to that ($\overline{M}_W/\overline{M}_N$)$_R$ of the starting polyisoprene. The results are set forth in Table 2.

For control purposes, the cyclization reaction was conducted using either tin tetrachloride or p-toluenesulfonic acid alone and the initial reaction rate, gel formation and change in molecular weight distribution were investigated. The results are also set forth in Table 2. When the reaction was not reproducible, for example when tin tetrachloride alone was used, the experiment was repeated and the best values were selected.

TABLE 2

| No. | Molar ratio[1] | Initial rate of reaction[2] | Presence of gels | C/R ranking[3] |
|---|---|---|---|---|
| 1 | 1/0 | 0.012 | No | III |
| 2 | 200/1 | 0.085 | No | III |
| 3 | 150/1 | 0.12 | No | II |
| 4 | 60/1 | 0.25 | No | II |
| 5 | 50/1 | 0.30 | No | I |
| 6 | 24/1 | 0.60 | No | I |
| 7 | 5.7/1 | 1.19 | No | I |
| 8 | 2.8/1 | 1.26 | No | I |
| 9 | 1/1 | 1.00 | No | I |
| 10 | 1/2 | 0.93 | No | I |
| 11 | 1/3 | 0.68 | Sparse | — |
| 12 | 1/10 | 0.25 | Sparse | — |
| 13 | 1/20 | 0.13 | Abundant | — |
| 14 | 0/1 | <0.05 | — | — |

[1]Molar ratio: (the number of moles of tin tetrachloride used)/(the number of moles of p-toluenesulfonic acid used)
[2]Initial rate of reaction: The rate of increase in degree of cyclization per unit time (minute) and unit amount of catalyst.
[3]C/R ranking: The ($\overline{M}_W/\overline{M}_N$)$_C$/($\overline{M}_W/\overline{M}_N$)$_R$ value was ranked on the following scale.
I: Less than 2
II: 2 to 3
III: More than 3

In the above formula,
($\overline{M}_W/\overline{M}_N$)$_C$: the molecular weight distribution of the cyclization product
($\overline{M}_W/\overline{M}_N$)$_R$: the molecular weight distribution of the starting cis-1,4-polyisoprene.

EXAMPLE 3 AND CONTROL EXAMPLE 2

The cyclization reaction was conducted in the same manner as Example 1 except that the molar ratio of tin tetrachloride to p-toluenesulfonic acid, amount of catalyst and reaction temperature and time were varied as ones shown in Table 3, until a cyclization degree of 50 to 65% was reached. After the cyclization reaction, the catalyst residues were removed by washing with water, whereupon the reaction mixture became clear and colorless just as before the reaction. The changes in degree of cyclization and molecular weight distribution are as shown in Table 3.

For control purposes, the same experiment was performed using either tin tetracholoride or p-toluenesulfonic acid alone.

TABLE 3

| No. | Molar ratio | Amount of catalyst[1] | Reaction temperature (°C.) | Reaction time (hrs.) | Color of reaction mixture after washing with water | Presence of gels | Degree of cyclization of the product (%) | C/R |
| --- | --- | --- | --- | --- | --- | --- | --- | --- |
| 1 | 1/0 | 0.5 | 40 | 4.0 | Light yellow | — | <5 | — |
| 2 | 1/0 | 15.7 | 40 | 12.0 | Yellow | No | 51 | 6.6 |
| 3 | 24/1 | 2.3 | 40 | 2.0 | Colorless | No | 64 | 1.46 |
| 4 | 5.7/1 | 1.0 | 40 | 1.5 | Colorless | No | 59 | 1.29 |
| 5 | 2.3/1 | 0.5 | 40 | 2.0 | Colorless | No | 55 | 1.30 |
| 6 | 2.3/1 | 0.5 | 80 | 1.0 | Colorless | No | 63 | 1.36 |
| 7 | 1/1 | 0.3 | 40 | 3.0 | Colorless | No | 52 | 1.11 |
| 8 | 1/1 | 0.3 | 80 | 2.0 | Colorless | No | 63 | 1.24 |
| 9 | 1/2 | 0.3 | 40 | 4.0 | Colorless | No | 52 | 1.12 |
| 10 | 0/1 | 0.5 | 40 | 4.0 | Light yellow | — | <5 | — |
| 11 | 0/1 | 1.4 | 80 | 7.0 | Red-orange[2] | Abundant | 62 | — |

[1]Amount of catalyst: The total number of moles of tin tetrachloride and p-toluenensulfonic acid per 100 moles of isoprene monomer units of the polyisoprene.
[2]Centrifugation at 2,000 G · hr. was required for removal of gels, and the supernatant was still red-orange in color.

EXAMPLE 4 AND CONTROL EXAMPLE 3

The cyclization reaction was conducted in the same manner as Example 1 except that the Brønsted acids shown in Table 4 were used in lieu of p-toluenesulfonic acid and that the reaction were carried out for hours as shown in Table 4, and the color of the reaction mixture and the degree of cyclization of the cyclized polymer were investigated. The results are set forth in Table 4. For control purposes, the same reaction was conducted using sulfuric acid as a Brønsted acid and using each of the Brønsted acids alone.

TABLE 4

| No. | Brønsted acid | Molar ratio | Amount of catalyst | Reaction time (hrs) | Color of reaction mixture after washing | Degree of cyclization of product (%) |
| --- | --- | --- | --- | --- | --- | --- |
| 1 | Sulfuric acid | 1/1 | 0.5 | 1.0 | Red-orange[1] | — |
| 2 | Methanesulfonic acid | 1/1 | 0.3 | 1.0 | Colorless (clear) | 71 |
| 3 | Benzenesulfonic acid | 1/1 | 1.5 | 1.0 | Colorless (clear) | 67 |
| 4 | Trifluoroacetic acid | 1/1 | 0.5 | 2.0 | Colorless (clear) | 56 |
| 5 | Methanesulfonic acid | 0/1 | 0.5 | 4.0 | Light yellow | <5 |
| 6 | Trifluoroacetic acid | 0/1 | 0.5 | 4.0 | Light yellow | <5 |

[1]The reaction mixture became turbid upon washing with water, and centrifugation at 20,000 G · hr. failed to give a clear, colorless supernatant.

EXAMPLE 5 AND CONTROL EXAMPLE 4

The reaction procedure of Example 1 was repeated except that titanium tetrachloride and dichloroacetic acid were used as the catalyst. The molar ratio of catalyst components, amount of catalyst, reaction time, and the degree of cyclization of the product cyclized polymer are as shown in Table 5. For control purposes, the cyclization reaction was conducted using sulfuric acid in lieu of dichloroacetic acid as Brønsted acid or only dichloroacetic acid as the catalyst but under otherwise the same conditions as above.

TABLE 5

| No. | Brønsted acid | Molar ratio | Amount of catalyst | Reaction time (hrs.) | Color or reaction mixture after washing | Degree of cyclization of product (%) |
| --- | --- | --- | --- | --- | --- | --- |
| 1 | Dichloroacetic acid | 1/1 | 0.5 | 4.0 | Colorless (clear) | 51 |
| 2 | Sulfuric acid | 1/1 | 0.5 | 4.0 | Red-brown | —[1] |
| 3 | Dichloroacetic acid | 0/1 | 0.5 | 4.0 | Light yellow | <5 |

[1]The amount of the insoluble fraction was too large to permit determination.

EXAMPLE 6 AND CONTROL EXAMPLE 5

The cyclization reaction was conducted in the same manner as Example 1 except that tin tetrachloride and p-toluenesulfonic acid were used as the catalyst in a molar ratio of 1:1 and in a catalyst amount of 1.0. The degree of cyclization of the product cyclized polymer is shown in Table 6.

As a control experiment, the same reaction was conducted using aluminum tribromide in lieu of tin tetrabromide.

TABLE 6

| No. | Lewis acid | Reaction time (hrs.) | Color of reaction mixture after washing | Degree of cyclization of product (%) |
| --- | --- | --- | --- | --- |
| 1 | Tin tetrabromide | 3 | Colorless (clear) | 45% |
| 2 | Aluminum tribromide | 1 | Red-orange | —[1] |

[1]The amount of the insoluble fraction was too large to permit determination.

EXAMPLE 7 cis-1,4-Polyisoprene with a weight average molecular weight of $(\overline{M}_W) = 116{,}200$, a molecular weight distribution of $(\overline{M}_W/\overline{M}_N)_R = 1.46$, and a cis-1,4 percentage of 71% as prepared by polymerizing isoprene with the aid of n-butyllithium as the catalyst was dissolved in xylene to give a 5% (by weight) solution. Under a dry nitrogen at 40° C., tin tetrachloride and methanesulfonic acid as diluted with a small amount of acetone were added in an amount of catalyst 0.3 and the reaction was conducted at 40° C. with stirring for 45 minutes. While this reaction was repeated several times, the reaction system was invariably homogeneous and the reaction mixture remained substantially uncolored or, if discolored, became colorless and clear upon washing with water. Moreover, substantially no gels remained on the 1 μm membrane filter. The cyclicity ratio, average cyclicity, percentage of each microstructure and molecular weight distribution are as set forth in Table 7. The C/R value indicative of the change in molecular weight distribution during the cyclization reaction was 1.27.

TABLE 7

| | |
|---|---|
| Cyclicity ratio | 0.30 |
| Average cyclicity | 4.3 |
| Percentage of unreacted isoprene units | 16.2 |
| Percentage of =CH$_2$ in cyclized segment | 20.3 |
| Percentage of =CH— in cyclized segment | 55.3 |
| Percentage of =C—CH$_3$ in cyclized segment | 8.3 |
| Degree of cyclization | 65.7% |
| Molecular weight distribution $(\overline{M}_W/\overline{M}_N)_C$ | 1.86 |

Figure 2:
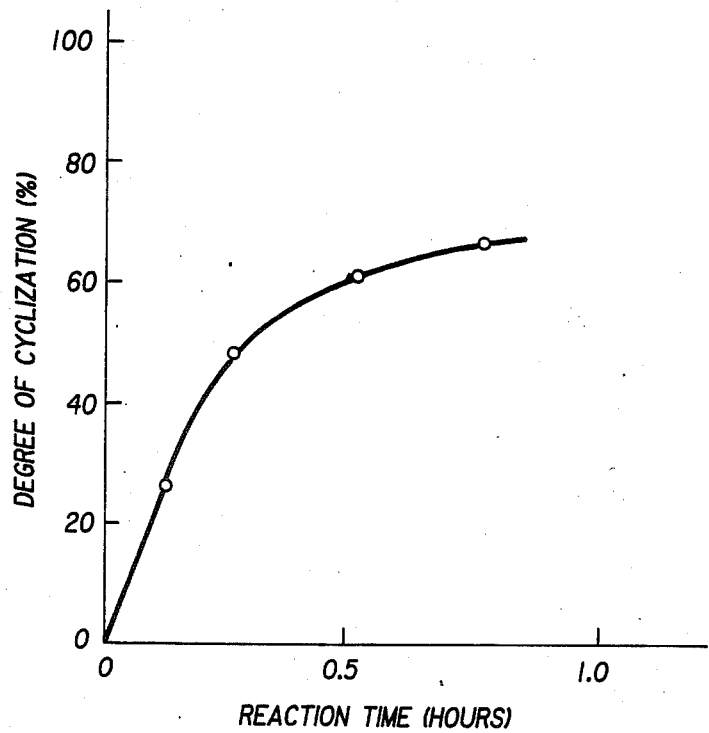

As shown in FIG. 2, the degree of cyclization of the product cyclized polymer increased linearly with time from immediately following the initiation of reaction, and then, traced a less steep curve till a saturation level was approached. While the above reaction was conducted several times, the relationship of reaction time with degree of cyclization substantially approximated the curve of FIG. 2, indicating a good reproducibility. It is, therefore, clear that the rate of increase in degree of cyclization of the product cyclized polymer is largely dependent on the initial rate of reaction, serving as an indicator of catalyst activity.

EXAMPLE 8

The cyclization reaction was conducted in the same manner as Example 7 except that methanesulfonic acid was used without dilution and that the reaction was conducted for 60 minutes. Though the reaction system was not homogeneous, the cyclization product showed a degree of cyclization of 71.2% and a molecular weight distribution of $(\overline{M}_W/\overline{M}_N)_C = 2.25$ and there was no gelation nor discoloration of the reaction mixture in the course of reaction. The degree of cyclization of a product polymer sampled from a reaction mixture at 45 minutes after initiation of reaction was 68.3%.

EXAMPLE 9 AND CONTROL EXAMPLE 6

In the same procedure as Example 7, the molar ratio of tin tetrachloride to methanesulfonic acid was varied as shown in Table 8 and the initial rate of reaction was investigated in terms of the rate of increase in the degree of cyclization per unit time and unit amount of catalyst. The results are set forth in Table 8.

For control purposes, the cyclization reaction was conducted using either tin tetrachloride or methanesulfonic acid alone and the initial rate of reaction was investigated in the same manner. The results are also shown in Table 8. As the reproducibility was poor when tin tetrachloride or methanesulfonic acid was used alone, the reaction was repeated several times and the best values are shown.

TABLE 8

| No. | Molar ratio[1] | Initial rate of reaction[2] |
|---|---|---|
| 1 | 1/0 | 0.012 |
| 2 | 9/1 | 1.6 |
| 3 | 4/1 | 7.9 |
| 4 | 2.3/1 | 10.4 |
| 5 | 1/1 | 12.1 |
| 6 | 1/2.3 | 13.7 |
| 7 | 1/4 | 11.1 |
| 8 | 1/9 | 9.2 |
| 9 | 1/19 | 1.1 |
| 10 | 0/1 | <0.01 |

[1]Molar ratio: (The number of moles of tin tetrachloride used)/(the number of moles of methanesulfonic acid used)
[2]Initial rate of reaction: The rate of increase in degree of cyclization per unit time (minute) and unit catalyst amount.

EXAMPLE 10 AND CONTROL EXAMPLE 7

The cyclization reaction was conducted until the degree of cylclization of the reaction product was 50 to 70% in the same manner as Example 7 except that the molar ratio of tin tetrachloride to methanesulfonic acid, amount of catalyst, and reaction time and temperature are varied as ones shown in Table 9. When, at the end of cyclization reaction, catalyst residues were removed by washing with water, the product solution became as clear and colorless as the solution before the reaction. The degree of cyclization of the product polymer and the change in molecular weight distribution during the cyclization reaction were as set forth in Table 9.

The reaction mixture after aqueous washing was filtered through a 1 μm membrane filter to investigate the presence of gels on the filter. The results are also shown in Table 9.

For control purposes, the cyclization reaction was also carried out using either tin tetrachloride or methanesulfonic acid alone and the degree of cyclization, change in molecular weight distribution, and gelation were investigated in the same manner. The results are also shown in Table 9.

TABLE 9

| No. | Molar ratio | Amount of catalyst | Reaction temperature (°C.) | Reaction time (hrs.) | Color of reaction mixture after washing with water | Presence of gels | Degree of cyclization of product (%) | C/R |
|---|---|---|---|---|---|---|---|---|
| 1 | 1/0 | 0.5 | 40 | 4.0 | Light yellow | — | <5 | — |
| 2 | 1/0 | 15.7 | 40 | 12.0 | Yellow | No | 51 | 6.6 |
| 3 | 9/1 | 0.5 | 40 | 3.0 | Colorless | No | 60 | 1.58 |
| 4 | 4/1 | 0.5 | 40 | 1.5 | " | " | 64 | 1.45 |
| 5 | 2.3/1 | 0.5 | 40 | 0.3 | " | " | 66 | 1.32 |

TABLE 9-continued

| No. | Molar ratio | Amount of catalyst | Reaction temperature (°C.) | Reaction time (hrs.) | Color of reaction mixture after washing with water | Presence of gels | Degree of cyclization of product (%) | C/R |
|---|---|---|---|---|---|---|---|---|
| 6 | 1/2.3 | 0.5 | 40 | 0.2 | " | " | 69 | 1.17 |
| 7 | 1/4 | 0.5 | 40 | 0.3 | " | " | 66 | 1.32 |
| 8 | 1/9 | 0.5 | 40 | 1.0 | " | " | 65 | 1.14 |
| 9 | 1/9 | 0.35 | 80 | 0.25 | " | " | 70 | 1.75 |
| 10 | 1/19 | 0.5 | 40 | 5.0 | " | " | 50 | 1.35 |
| 11 | 0/1 | 0.5 | 40 | 4.0 | Light yellow | Small amount | <5 | — |
| 12 | 0/1 | 15.7 | 40 | 8.0 | Yellow | Small amount | <5 | — |
| 13 | 0/1 | 15.7 | 80 | 0.7 | Yellow | Small amount | 58 | — |

EXAMPLE 11

The cyclization reaction was conducted using each of the aliphatic sulfonic acids shown in Table 10 in lieu of methanesulfonic acid, with a catalyst amount of 0.5 and a reaction time of 30 minutes but otherwise under the same conditions as Example 8. In any case there were substantially no side reactions such as discoloration and gelation. The degree of cyclization of each product is shown in Table 10.

TABLE 10

| No. | Aliphatic sulfonic acid | Degree of cyclization of product (%) |
|---|---|---|
| 1 | Ethanesulfonic acid | 67 |
| 2 | 1-Propanesulfonic acid | 74 |
| 3 | 1-Butanesulfonic acid | 64 |

EXAMPLE 12 AND CONTROL EXAMPLE 8

The reaction procedure of Example 8 was repeated except that titanium tetrachloride or aluminum tribromide was used as the Lewis acid component and that the catalyst amount and reaction time are varied as ones shown in Table 11. The degree of cyclization of each cyclization reaction product is shown in Table 11.

TABLE 11

| No. | Lewis acid | Amount of catalyst | Reaction time (hrs.) | Degree of cyclization of product (%) |
|---|---|---|---|---|
| 1 | Titanium tetrachloride | 5.0 | 4 | 45 |
| 2 | Aluminum tribromide | 3.0 | 6 | <5 |

EXAMPLE 13

In each of two autoclaves, 68.1 g (1 mole) of purified and dehydrated isoprene was dissolved in 390 g of purified and dehydrated xylene, and after addition of 0.003 g (0.6 mmole) of n-butyllithium, the polymerization reaction was conducted at 60° C. After confirming that the conversion of polymerization was 100% by gas chromatographic analysis of the gaseous phase, 0.52 g (2.4 mmoles) of 2,6-di-t-butyl-4-methylphenol was added. The reaction product taken out from one of the autoclaves was found to be a polyisoprene having a weight average molecular weight of $(\overline{M}_W) = 162,000$ and a molecular weight distribution of $(\overline{M}_W/\overline{M}_N) = 1.39$.

To the other autoclave was added 900 g of xylene to give a 5% (by weight) solution of polyisoprene and while this solution was maintained at 40° C., 5.21 g (20 mmoles) of tin tetrachloride and 0.172 g (1 mmole) of p-toluenesulfonic acid were added. The reaction was conducted with stirring for 2.5 hours. The reaction mixture was slightly discolored in the course of reaction but became colorless upon washing with water at the end of the reaction.

After the catalyst residues were removed by washing with water, the solution was filtered through a 1 μm membrane filter. As a result, no gels were found on the membrane filter. The cyclicity ratio, average cyclicity, amount of each micro-structure, degree of cyclization, and molecular weight distribution of the cyclization product are as set forth in Table 12.

TABLE 12

| | |
|---|---|
| Cyclicity ratio | 0.29 |
| Average cyclicity | 3.5 |
| Percentage of unreacted isoprene units | 22.9 |
| Percentage of $=CH_2$ in cyclized segment | 12.2 |
| Percentage of $=CH-$ in cyclized segment | 54.2 |
| Percentage of $=\overset{\mid}{C}-CH_3$ in cyclized segment | 10.8 |
| Degree of cyclization | 59.6% |
| Molecular weight distribution $(\overline{M}_W/\overline{M}_W)$ | 1.88 |

The above polymerization of isoprene, addition of the phenolic compound, and the subsequent cyclilzation reaction were carried out several times and as a result, substantially no change was found in the average molecular weight and its distribution of the product polyisoprene, the properties of the cyclization product mixture and the cyclicity ratio, average cyclicity, percentage of each microstructure and molecular weight distribution of the cyclized polyisoprene, indicating a good reproducibility of the procedure of this example.

On the other hand, after the above polymerization of isoprene, the reaction mixture was poured into a large quantity of acetone and the isolated and purified polyisoprene was dissolved in xylene to give a 5% (by weight) solution. Using this polyisoprene solution, the cyclization reaction was carried out under the same conditions as mentioned above. The cyclicity ratio, average cyclicity, percentage of each microstructure, and molecular weight distribution of the cyclized polyisoprene are substantially the same as those set forth in Table 12.

EXAMPLE 14

In 8 autoclaves, purified and dehydrated isoprene was dissolved in purified and dehydrated xylene, and after addition of n-butyllithium in an amount of 0.075%

(by mole) based on said isoprene, the polymerization reaction was carried out at 60° C. After confirming a complete consumption of isoprene, 2,6-di-t-butyl-4-methylphenol was added to six of the above autoclaves at the levels shown in Table 13 in terms of the molar equivalent ratio of hydroxyl group to the n-butyllithium used (P/I Ratio in Table 13). On the other hand, the reaction mixture in another autoclave was poured into a large quantity of acetone and the reaction product isolated therefrom was analyzed. The analysis showed that this polyisoprene had a weight average molecular weight of $(\overline{M}_W) = 131,000$ and a molecular weight distribution of $(\overline{M}_W/\overline{M}_N) = 1.41$.

Xylene was added into the above-mentioned 7 autoclaves inclusive of the one which did not contain a phenoic compound in the solution to give a 5% (by weight) solution. Then, tin tetrachloride and p-toluenesulfonic acid were added in a molar ratio of 3/1 and in a catalyst amount of 0.5 and the cyclization reaction was conducted at 40° C. for 3 hours. The reaction product was investigated for the degree of cyclization and the presence of gels. The C/R value was also investigated and ranked. The results are set forth in Table 13.

EXAMPLE 15

In the same manner as Example 14, isoprene was polymerized completely and 2,6-di-t-butyl-4-methylphenol was added in a P/I ratio of 3.0. Then, tin tetrachloride and p-toluenesulfonic acid were added in the molar ratio of tin tetrachloride to p-toluenesulfonic acid and the catalyst amount as shown in Table 13. With these exceptions and except that the reaction time was varied as shown in Table 13, the cyclization reaction was conducted in otherwise the same manner as Example 14. The reaction product was analyzed for the degree of cyclization, presence of gels and C/R ranking. The results are set forth in Table 13.

isoprene had been completely consumed, 6-(4-hydroxy-3,5-di-t-butylanilino)-2,4-bisoctylthio-1,3,5-triazine (I-565 in Table 14) and 2,2'-methylenebis(4-methyl-6-t-butylphenol) (NS-6 in Table 14) were added in the amount of P/I ratio shown in Table 14, respectively. The analysis at the end of the reaction showed that the product polymer was a polyisoprene having a $\overline{M}_W$ value of 191,000 and a $(\overline{M}_W/\overline{M}_N)$ value of 1.48.

The polyisoprene solution obtained above was diluted with xylene to a concentration of 5% (by weight) and tin tetrachloride and p-toluenesulfonic acid were added in a molar ratio of 2.3/1 and a catalyst amount of 2.0. The cyclization reaction was conducted at 60° C. for 3 hours, and the reaction product was investigated for the degree of cyclization, presence of gels and C/R ranking. The results are set forth in Table 14.

TABLE 14

| No. | Phenolic compound | P/I ratio | Degree of cyclization (%) | Presence of gels | C/R ranking |
|---|---|---|---|---|---|
| 1 | — | 0 | 21.9 | No | III |
| 2 | I-565 | 0.1 | 26.8 | " | III |
| 3 | " | 0.5 | 31.4 | " | III |
| 4 | " | 2.0 | 64.5 | " | I |
| 5 | " | 10.0 | 59.8 | " | I |
| 6 | " | 50.0 | 3.0 | " | I |
| 7 | NS-6 | 0.1 | 11.5 | " | III |
| 8 | " | 1.0 | 58.8 | " | I |
| 9 | " | 30.0 | 7.3 | " | I |

EXAMPLE 17 AND CONTROL EXAMPLE 9

The polymerization reaction, addition of 2,6-di-t-butyl-4-methylphenol, and cyclization reaction were carried out in the same manner as Example 13 except that each of the Brønsted acids mentioned in Table 15 was used in lieu of p-toluenesulfonic acid in the molar ratio and catalyst amount indicated in Table 15 and that

TABLE 13

| | No. | Reaction conditions | | | | Cyclization product | | |
|---|---|---|---|---|---|---|---|---|
| | | P/I ratio[1] | Molar ratio[2] | Amount of catalyst[3] | Reaction time (hrs.) | Degree of cyclization (%) | Presence of gels | C/R ranking[4] |
| Example 14 | 1 | 0 | 3/1 | 0.5 | 3.0 | 15.8 | No | III |
| | 2 | 0.1 | 3/1 | 0.5 | 3.0 | 21.6 | No | III |
| | 3 | 0.5 | 3/1 | 0.5 | 3.0 | 22.9 | No | III |
| | 4 | 1.0 | 3/1 | 0.5 | 3.0 | 53.5 | No | I |
| | 5 | 3.0 | 3/1 | 0.5 | 3.0 | 58.5 | No | I |
| | 6 | 10.0 | 3/1 | 0.5 | 3.0 | 59.5 | No | I |
| | 7 | 50.0 | 3/1 | 0.5 | 3.0 | 6.8 | No | I |
| Example 15 | 1 | 3.0 | 1/0 | 10.0 | 5.0 | 13.5 | No | III |
| | 2 | 3.0 | 150/1 | 5.0 | 5.0 | 39.5 | No | II |
| | 3 | 3.0 | 50/1 | 3.0 | 4.0 | 42.6 | No | I |
| | 4 | 3.0 | 5/1 | 1.0 | 2.0 | 63.1 | No | I |
| | 5 | 3.0 | 1/1 | 1.0 | 1.5 | 59.5 | No | I |
| | 6 | 3.0 | 1/2 | 1.0 | 1.5 | 55.4 | No | I |
| | 7 | 3.0 | 1/10 | 3.0 | 5.0 | 40.3 | Sparse | — |
| | 8 | 3.0 | 0/1 | 5.0 | 5.0 | 0 | — | — |

[1]P/I ratio: (The hydroxyl equivalent of phenolic compound)/(the lithium equivalent of n-butyllithium)
[2]Molar ratio: (The number of moles of tin tetrachloride used)/(The number of moles of p-toluenesulfonic acid used)
[3]Amount of catalyst: The total number of moles of tin tetrachloride and p-toluenesulfonic acid per 100 moles of isoprene units of the polyisoprene
[4]C/R ranking: The $(\overline{M}_W/\overline{M}_N)_C/(\overline{M}_W/\overline{M}_N)_R$ value was ranked on the following scale.
I: Less than 2
II: 2 to 3
III: More than 3

EXAMPLE 16

In an autoclave, purified and dehydrated isoprene was dissolved in purified and dehydrated xylene, followed by addition of n-butyllithium in a proportion of 0.055% (by mole) based on the isoprene. The polymerization reaction was conducted at 60° C. and when the the cyclization reaction time was varied as shown in Table 15. The reaction mixture at the end of the reaction was examined for its properties and the degree of cyclization and C/R ranking of the cyclized polyisoprene. The results are set forth in Table 15.

For control purposes, the production of cyclized polyisoprene was carried out using sulfuric acid as a Brønsted acid or each of the Brønsted acids alone in otherwise the same manner as Example 13 excepting the conditions shown in Table 15. The reaction mixture was also examined for its properites and the degree of cyclization and change in molecular weight distribution of the cyclized polyisoprene. The results are set forth in Table 15.

TABLE 15

| | Reaction conditions | | | Results of reaction | | |
|---|---|---|---|---|---|---|
| No. | Brønsted acid | Molecular ratio | Amount of catalyst | Reaction time (hrs.) | Color of reaction mixture after washing | Degree of cyclization (%) | C/R ranking |
| 1 | Sulfuric acid | 1/1 | 1.0 | 5.0 | Red-orange | — | — |
| 2 | Methanesulfonic acid | 1/1 | 0.5 | 0.5 | Colorless | 64 | I |
| 3 | Butanesulfonic acid | 1/1 | 0.3 | 0.5 | Colorless | 55 | I |
| 4 | Benzenesulfonic acid | 1/1 | 1.0 | 1.5 | Colorless | 60 | I |
| 5 | Trifluoroacetic acid | 1/1 | 1.0 | 1.0 | Colorless | 58 | I |
| 6 | Methanesulfonic acid | 0/1 | 1.0 | 5.0 | Light yellow | <5 | — |
| 7 | Trifluoroacetic acid | 0/1 | 1.0 | 5.0 | Light yellow | <5 | — |

What is claimed is:

1. A method for producing a cyclized polydiene, comprising cyclizing a polydiene which is at least one member selected from the group consisting of polyisoprenes and polybutadienes, wherein the said polydiene has a weight average molecular weight of from 10,000 to 1,000,000, and wherein the said cyclizing is performed in an organic solvent in the presence of a binary catalyst which comprises a Lewis acid which is at least one member selected from the group consisting of tin halides and titanium halides and a Brønsted acid which is at least one member selected from the group consisting of sulfonic acids of the generic formula R—$SO_3H$, where R is a $C_{1-10}$ alkyl or a $C_{6-10}$ aryl group.

2. A method according to claim 1, wherein said Lewis acid is tin tetrachloride.

3. A method according to claim 1, wherein said Lewis acid is titanium tetrachloride.

4. A method according to claim 1, wherein said Brønsted acid is an aromatic sulfonic acid.

5. A method according to claim 4, wherein said aromatic sulfonic acid is benzenesulfonic acid or toluenesulfonic acid.

6. A method according to claim 1, wherein said Bronsted acid is an alkanesulfonic acid.

7. A method according to claim 6, wherein said alkanesulfonic acid comprises methanesulfonic acid, ethanesulfonic acid, propanesulfonic acid or butanesulfonic acid.

8. A method according to claim 1, wherein the said Lewis acid is tin tetrachloride or titanium tetrachloride, said Brønsted acid is an aromatic sulfonic acid, and said Lewis acid and Brønsted acid are used in a molar ratio ranging from 150:1 to 1:10.

9. A method according to claim 1, wherein said Lewis acid is tin tetrachloride or titanium tetrachloride, said Brønsted acid is an alkanesulfonic acid, and said Lewis acid and Brønsted acid are used in a molar ratio ranging from 200:1 to 1:200.

10. A method according to claim 1, wherein said polydiene is an polyisoprene.

11. A method according to claim 1, wherein a polydiene solution in obtained by polymerization reaction in an organic solvent in the presence of an organolithium compound, a phenolic a compound is added thereto to obtain an organic solvent solution which is then used in the cyclization reaction.

12. A method according to claim 11, wherein said organolithium compound is a monolithium compound of the general formula R'Li wherein R' is an alkyl group of 1 to 12 carbon atoms or an aryl group of 6 to 12 carbon atoms.

13. A method according to claim 11, wherein said phenolic compound is a phenolic compound having an alkyl group in the α-position.

14. A method according to claim 11, wherein said phenolic compound is 2,6-di-t-butyl-4-methylphenol, 6-(4-hydroxy-3,5-di-t-butylanilino)-2,4-bisoctylthio-1,3,5-triazine or 2,2'-methylenebis(4-methyl-6-t-butylphenol).

15. A method according to claim 11 wherein said phenolic compound is used in an amount such that the molar equivalent ratio of hydroxyl group to lithium in said organolithium is in the range of 0.8 to 20.

16. A method for producing a cyclized polydiene comprising cyclizing a polydiene which is at least one member selected from the group consisting of (1) polyisoprene containing at least about 70% 1,4-polyisoprene units and (2) polybutadiene containing at least about 70% 1,4-polybutadiene units; wherein the said polydiene has a weight average molecular weight of from 10,000 to 1,000,000, and wherein the said cyclizing is performed in an organic solvent in the presence of a binary catalyst which comprises a Lewis acid which is at least one one member selected from the group consisting of tin halides and titanium halides and a Brønsted acid which is at least member selected from the group consisting of sulfonic acids of the general formula R—$SO_3H$, where R is a $C_{1-10}$ alkyl or a $C_{6-10}$ aryl group.

* * * * *